C. F. FELTZ.
MOTOR DRIVEN VEHICLE.
APPLICATION FILED JAN. 5, 1914.
1,193,132.
Patented Aug. 1, 1916.
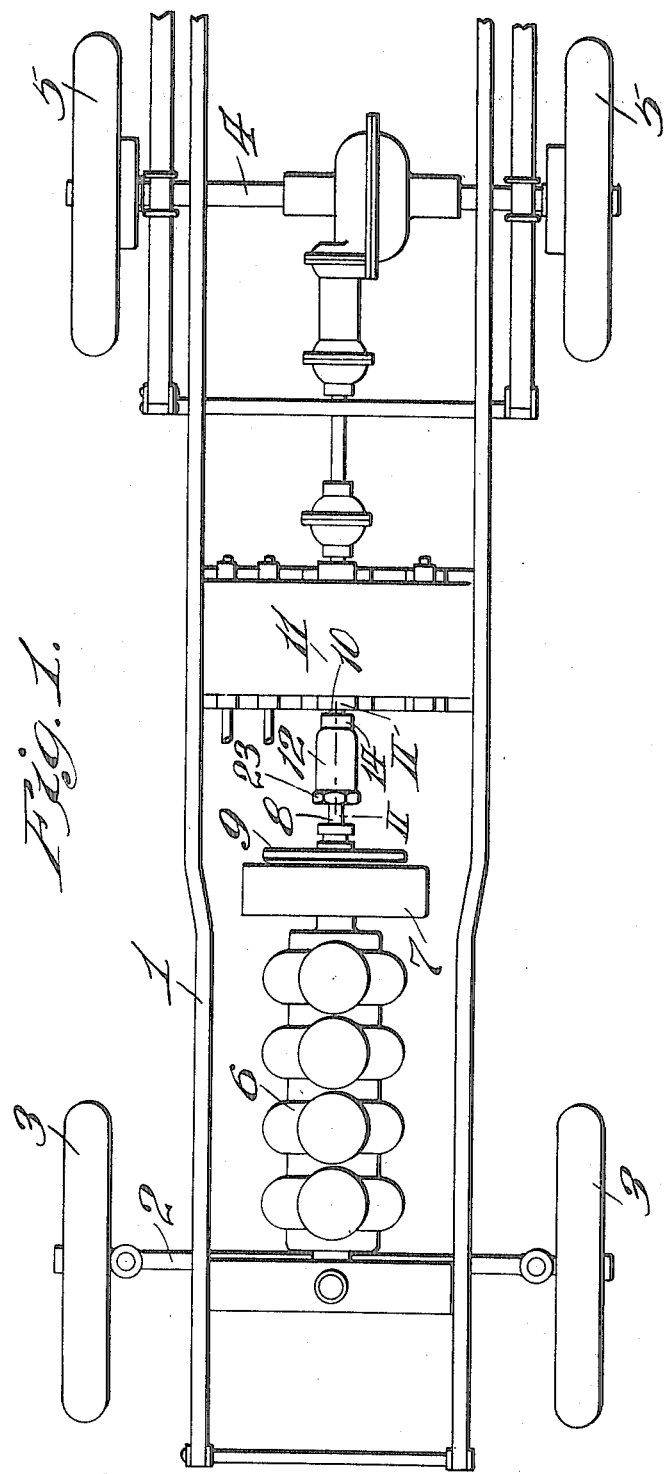
attest:
L. Langdale
M. C. Hammon
Inventor:
Charles F. Feltz.
By Knight Bros.
attys.

UNITED STATES PATENT OFFICE.

CHARLES F. FELTZ, OF ST. LOUIS, MISSOURI, ASSIGNOR OF ONE-THIRD TO WILLIAM E. ANDERSON AND ONE-THIRD TO STONAY L. LANGDALE, OF ST. LOUIS, MISSOURI.

MOTOR-DRIVEN VEHICLE.

1,193,132.  Specification of Letters Patent.  Patented Aug. 1, 1916.

Application filed January 5, 1914. Serial No. 810,373. REISSUED

*To all whom it may concern:*

Be it known that I, CHARLES F. FELTZ, a citizen of the United States of America, residing in the city of St. Louis and State of Missouri, have invented certain new and useful Improvements in Motor-Driven Vehicles, of which the following is a specification.

The primary object of this invention is to provide improved means in a motor driven vehicle whereby, if the speed of the driving wheels thereof is accelerated above the intended driving speed of the motor, the motor will be automatically released from driving contact with the driven wheels.

Another object is to provide improved means whereby the motor cannot be driven by the tractor wheels of the vehicle.

Other and further objects will appear in the specification, and be specifically pointed out in the appended claims, reference being had to the accompanying drawings exemplifying the invention, and in which, Figure 1 is a plan view of the running gear of a vehicle showing a motor mounted therein. Fig. 2 is an enlarged section taken on the line II—II, Fig. 1. Fig. 3 is an enlarged section taken on the line III—III, Fig. 2.

Referring to the drawings, the frame 1 of the vehicle is mounted at its forward end on the front axle 2, said axle being supported by the steering wheels 3. The rear end of the frame is supported on the rear axle 4, said rear axle being mounted in the traction wheels 5. Supported adjacent the forward end of the frame in any suitable manner is the motor 6. The shaft of said motor has mounted at one end the usual fly wheel 7.

Mounted in horizontal alinement with the engine shaft is a drive shaft 8, said shaft supporting at one end the clutch member 9, which is adapted to be engaged with the fly wheel 7. In order to embody this improved device in a vehicle, there is a driven shaft 10 in horizontal alinement with the shaft 8. Said shaft 10 leads to the transmission gearing 11.

Mounted on the ends of the shafts 8 and 10 is a ratchet or clutch 12, said clutch comprising a casing 13 having a hub 14, said hub being securely mounted on the end of the shaft 10 by the key 15. Formed in said casing 13, at the end opposite to the hub 14, is a chamber 16. Said chamber is for the reception of a series of rollers 17 which are supported in the pockets 18 of the roller-carrying member 19 which is formed on the shaft 8. Formed in the end of the chamber 16 is a circular recess 20 in which is mounted an end thrust bearing 21. Said end thrust bearing is for the reception of the reduced end 22 of the shaft 8. In order to retain the rollers 17 and roller-carrying member 19 in the chamber 16, a nut 23 is screwed into the open end of said chamber 16.

In the operation of the ordinary type of motor driven vehicles, when the motor is coupled with any one of the different transmission wheels, all of the driving elements between the motor and the traction wheels will move at a fixed speed with respect to the speed of the motor. The type of driving mechanism now in general use on motor vehicles, includes a clutch and a transmission device for transmitting power from the motor to the traction wheels, and when the motor is coupled to the traction wheels through the medium of these devices, the motor will drive the traction wheels under some conditions, and under other conditions the traction wheels will drive the motor. When the vehicle is traveling down a hill the motor may be uncoupled from the traction wheels, and in this event, the traction wheels will be permitted to run at an excessive speed with respect to the speed of the motor. If, under these conditions, the motor is suddenly coupled to the transmission mechanism, all of the mechanism will be subjected to a very severe shock for the reason that the rapidly moving traction wheels are running at a much higher speed than the power mechanism, and the rapid movements of the traction wheels will be suddenly transmitted to the motor. An inexperienced or careless operator will frequently couple a motor to the traction wheels immediately after the vehicle passes from the bottom of a hill, and since the traction wheels are then running at a high rate of speed with respect to the motor, the power suddenly transmitted from the traction wheels to the motor will result in severe shocks at all points throughout the motor and transmission mechanism.

My improved mechanism will positively drive the traction wheels under normal conditions, and if the power mechanism is coupled to the transmission mechanism while the traction wheels are running at an excessive rate of speed, said traction wheels will not drive the motor, and as a result, the shocks referred to will be avoided. If the vehicle is traveling at a very high rate of speed, after passing from an incline, the motor may be coupled to the transmission mechanism to provide for any desired speed, and there will be no transmission of power either from the motor to the traction wheels, or vice versa, until the speed of the vehicle is in synchronism with the speed of the power mechanism. If the traction wheels are traveling at an excessive rate of speed, said wheels will turn independently of the motor until the speed of the vehicle agrees with the speed of the motor. The motor will then begin to drive the vehicle without jerking or in any way impairing the power mechanism.

In transmitting power from the motor to the transmission device, the clutch members travel in the direction indicated by the arrow in Fig. 3. The rollers 17 are forced into engagement with the inner face of the member 13, and the power is positively transmitted from the roller carrying member 19 to the outer member 13. However, when the traction wheels are turning at an excessive rate of speed, the outer clutch member 13 will turn freely without transmitting movement to the motor.

What I claim is:

1. In a motor vehicle, driving mechanism comprising a motor, transmission gearing, a drive shaft operable by said motor, a driven shaft for operating said transmission gearing, said drive shaft being alined with said driven shaft, and a clutch device including a clutch member secured to one of said shafts and overlapping the other shaft, said clutch device being adapted to lock said drive shaft to said driven shaft when said motor is transmitting power to said transmission gearing, said driven shaft being free to turn at a higher rate of speed than the drive shaft when the clutch device is in its operative condition and said clutch device being free to uncouple said shafts automatically when said driven shaft is turned at a higher rate of speed than the speed of said drive shaft.

2. In a motor vehicle, driving mechanism comprising traction wheels, a transmission device for transmitting power to said traction wheels, a motor, and means for transmitting power from said motor to said transmission device, said means including a drive shaft operable by said motor, a driven shaft for transmitting power from said drive shaft to said transmission device, and a clutch device adapted to unite said shafts when they are turning at the same speed, said driven shaft being free to turn at a higher rate of speed than the drive shaft when the clutch device is in its operative condition and said clutch device being free to uncouple said shafts automatically when said driven shaft turns at a higher rate of speed than said drive shaft, thereby permitting said traction wheels, transmission device and driven shaft to turn independently of said motor and drive shaft.

3. In a motor vehicle, driving mechanism comprising a motor, a transmission device, alined shafts extending from and located between said motor and transmission device, and a clutch device adapted to unite said shafts when they are turning at the same speed, the driven elements of said clutch device being free to turn at a greater speed than the drive elements when the clutch device is in its operative condition, thereby allowing the driven shaft to turn at a greater speed than the other shaft.

4. In a motor vehicle, driving mechanism comprising a motor, a transmission device adapted to be operated by said motor, a drive shaft leading from said motor, a driven shaft extending from said transmission device and alined with said drive shaft, and a clutch device adapted to rigidly connect said shafts when they are turning at the same speed, the driven elements of said clutch device being free to turn at a greater speed than the drive elements when the clutch device is in its operative condition, thereby allowing the driven shaft to be released automatically when one of said shafts turns at a higher rate of speed than the other shaft.

CHARLES F. FELTZ.

In the presence of—
S. L. LANGDALE,
M. C. HAMMON.